J. DETERS.
DRAFT EQUALIZER.
APPLICATION FILED FEB. 27, 1912.
1,032,276.
Patented July 9, 1912.
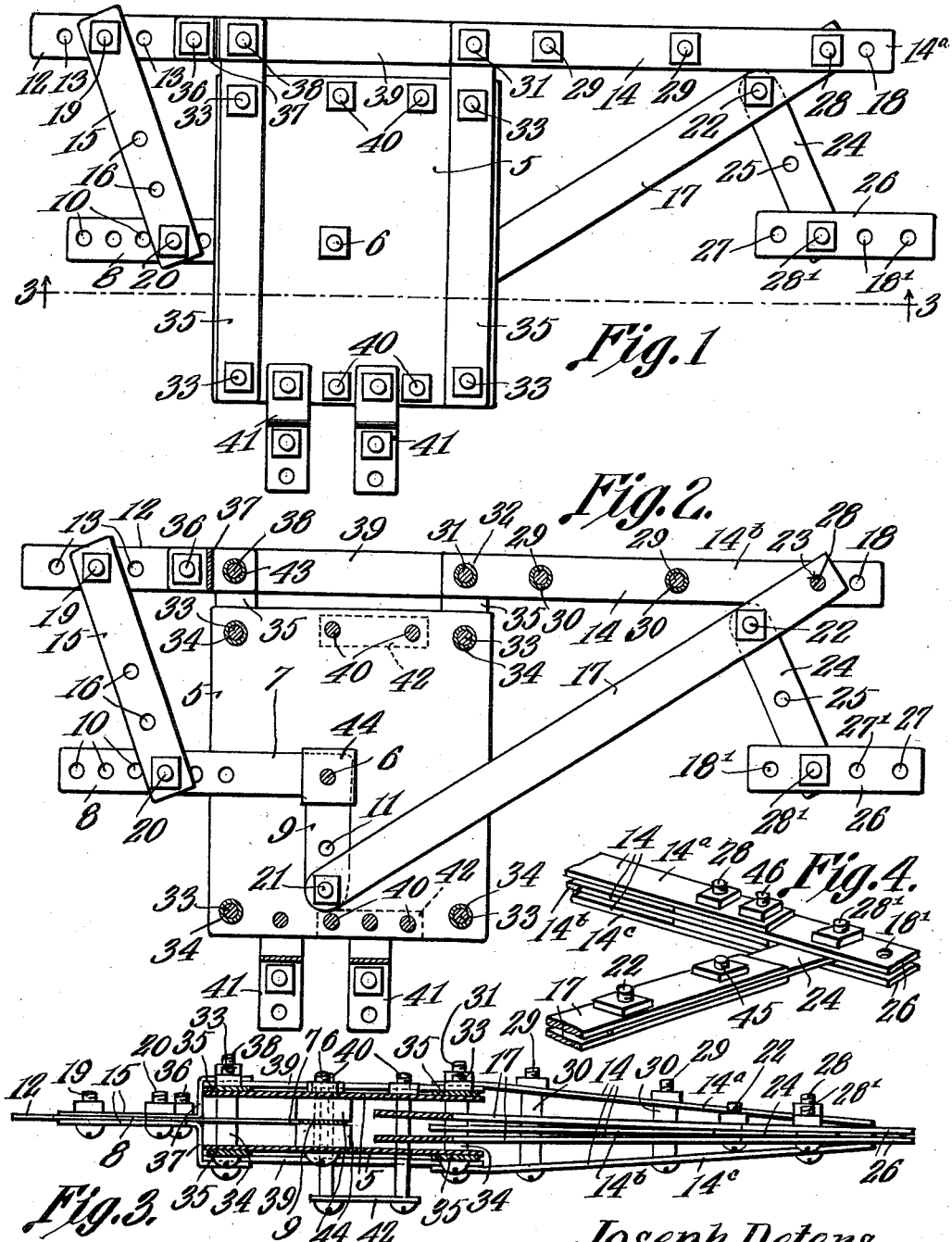
Witnesses
Joseph Deters,
Inventor
by C. A. Snow & Co.
Attorneys

UNITED STATES PATENT OFFICE.

JOSEPH DETERS, OF HAMLER, OHIO.

DRAFT-EQUALIZER.

1,032,276.   Specification of Letters Patent.   Patented July 9, 1912.

Application filed February 27, 1912. Serial No. 680,261.

*To all whom it may concern:*

Be it known that I, JOSEPH DETERS, a citizen of the United States, residing at Hamler, in the county of Henry and State of Ohio, have invented a new and useful Draft-Equalizer, of which the following is a specification.

This invention relates to draft equalizers, having for its object to provide a device of this character capable of attachment to the tongue of a vehicle or adapted to be attached to a gang plow or riding plow for the purpose of equalizing or evening the draft between a plurality of draft animals attached thereto.

Another object of the present invention is to provide a draft equalizer wherein provision may be made for equalizing the draft between two or more horses and one or more horses working in opposition to the draft of the former horses.

A further object of the invention is to provide a device of this character which shall be simple and substantial in construction, and which shall be convenient and efficient for the purposes for which it is designed.

To the above and other ends, this invention resides in the novel construction and combination of parts elicited in the following description and pointed out in the appended claims, it being understood that this device is susceptible of alterations or deviations in its details within the scope of the appended claims without departing from the spirit of the invention.

The invention is illustrated in its preferred embodiment in the accompanying drawings, wherein similar reference characters indicate similar parts.

Figure 1 is a plan view of the draft equalizer constructed in accordance with the present invention. Fig. 2 is a horizontal section of the device. Fig. 3 is a sectional view taken on the line 3—3 of Fig. 1. Fig. 4 is a fragmental perspective of a detail.

Referring specifically to the drawings, this device embodies a frame comprising spaced rectangular top and bottom plates 5 which have bolts 33 passing through the corners thereof, spacing sleeves 34 being arranged on the bolts 33 between the plates 5, strips 35 extending along the sides of the plates 5 on the outer faces thereof and which project beyond the forward ends of the plates 5 and are secured to the said plates by the bolts 33, and lateral or transverse strips 39 connecting the forward ends of the respective pairs of longitudinal strips 35, a bolt 31 being passed through the ends of the strips 39 and the strips 35 at one side and a bolt 38 being passed through the ends of the strips 39 and the strips 35 at the other side, which bolts have the respective spacing sleeves 32 and 43 mounted thereon. The foregoing structure constitutes the frame of the device, although it is understood that this frame may be altered in its details.

A short lever 12 is pivoted to the intermediate portion of the bolt 38, and strips 37 are secured at one end on the upper and lower faces of the lever 12 by a bolt 36 and have other ends off-set outwardly and pivoted on the extremities of the said bolt 38. This lever 12 is provided with a series of apertures 13.

To the bolt 31 is pivoted a long lever, designated generally by the numeral 14, which lever comprises an intermediate strip 14$^b$ pivoted at its inner end to the intermediate portion of the bolt 31, and the outer strips 14$^a$ and 14$^c$ pivoted at their inner ends to the extremities of the bolt 31 and converging outwardly, the bolts 29 passing through the strips 14$^a$, 14$^b$ and 14$^c$ at intermediate portions and bearing spacing sleeves 30 interposed between the intermediate strip 14$^b$ and the outer strips to retain the strips in position and render the lever as a whole substantial in construction. This lever 14 has an aperture 18 at its outer or free end and a bolt 28 is passed through the lever 14 adjacent the aperture 18 and spaced slightly inwardly therefrom.

The respective levers 12 and 14 project laterally from the respective sides of the frame, the lever 12 being adapted for the attachment of one or more draft animals, by means of the outermost aperture 13, and the lever 14 being adapted for the attachment of two or more draft animals by means of the aperture 18. These levers 12 and 14 are operatively connected in a novel manner whereby the draft of the greater number of animals attached to the lever 14 may be equalized by the draft of the animal or a smaller number of animals attached to the lever 12, which operative connection will be presently described.

A bolt 6 is passed through the plate 5 at a central point, and a bell crank lever 7 is pivoted or fulcrumed on the intermediate portion of the bolt 6, spacing washers or members 44 being interposed between the said lever and the plates 5 to retain the lever in position. This bell crank lever 7 has its short arm 9 projecting rearwardly and its long arm 8 projecting laterally toward and beyond the side of the frame to which the short lever 12 is pivoted. The arms 8 and 9 are provided with respective series of apertures 10 and 11. The arm 8 of the bell crank lever is connected to the short lever 12 by means of short twin links 15 which receive the lever 12 at their forward ends and which receive the arm 8 at their rear ends, the respective bolts 19 and 20 being passed through the front and rear extremities of the links 15 and through one of the apertures 13 and 10. The links 15 are provided with a series of apertures 16 extending inwardly from their rear ends, through which the bolt 20 is passed. By means of the apertures 13 in the lever 12 and the apertures 10 and 16 in the arm 8 and links 15, respectively, the links 15 may be adjusted to vary the leverage between the lever 12 and the arm 8 of the bell crank lever as may be desired or necessary. The lever 14 is connected to the short arm 9 of the bell crank lever by means of long diagonal twin links 17, which links have their forward or outer ends engaging the bolt 28 on the respective sides of the intermediate strip 14$^b$, a bolt 21 being passed through the inner or rear ends of the links 17 and through one of the apertures 11 in the arm 9. The apertures in the links 17 through which the bolt 28 passes are designated by the numeral 23. The apertures 11 permit the adjustment of the links 17 upon the arm 9 of the bell crank lever to vary the leverage between the lever 14 and the arm 9 of the bell crank lever as may be desired or essential, the rear or inner ends of the links 17 receiving the arm 9.

As shown, the various parts are adjusted for the attachment of a single horse or draft animal to the short lever 12 and for a pair of horses or draft animals to the long lever 14, whereby the draft of the single animal compensates for the draft of a pair of animals, the draft being equalized between the levers 12 and 14. To accommodate a larger number of horses or draft animals being used, provision has been made whereby extensions may be attached to the outer ends of the lever 14 and the links 17, which will be presently described. A bolt 22 is passed through the links 17 in proximity to the outer extremity thereof and a point spaced at a short distance inwardly from the apertures 23, and an extension 24 is pivoted at one end upon the bolt 22 between the links 17. This extension 24 has a bolt 28' mounted in the outer or free end thereof and has an intermediate aperture 25, which aperture 25 is spaced at a distance from the bolt 22 equal to the distance from the apertures 23 to the said bolt 22. A pair of twin bars 26 forming an extension for the lever 14 are mounted on the bolt 28' in proximity to one end of the said bars, the said bars having apertures 18' in the said extremity, apertures 27 in the other extremity, and apertures 27' between the apertures 27 and the bolt 28'.

To attach the extensions 24 and 26 to the ends of the lever 14 and the links 17, the bolt 28 is first removed to free the links 17 from the lever 14, and the extension 24 is then swung into alinement with the links 17, in which event the aperture 25 coincides or registers with the apertures 23 in the links 17. A bolt 45 is then passed through the apertures 23 and 25 to attach the extension 24 in rigid position to the ends of the links 17, the bars or extension 26 then being swung upon the extension 24 to pass between the intermediate strip 14$^b$ and the respective outer strips 14$^a$ and 14$^c$ of the lever 14, the bolt 28 then being replaced in the lever 14 to pass through the apertures 27, and the apertures 27' coinciding or registering with the apertures 18. A bolt 46 is then passed through the apertures 18 and 27' to rigidly attach the extension to the lever 14, the bolt 28' thus providing for a pivotal connection between the extensions of the lever 14 and links 17.

As shown in Figs. 1, 2 and 3, the extensions are in idle position, the extension 24 being pivoted to the links 17, and the extensions being shown attached to the lever 14 and links 17 in Fig. 4. When the attachments are brought into operative relation with the lever 14 and the links 17, the draft animals are connected to the extensions of the lever 14 by means of the apertures 18', the device being constructed as shown for the attachment of three horses or draft animals to the extension 26, in which event the links 15 are adjusted upon the lever 12 and arm 8 of the bell crank lever for the attachment of a pair of horses or draft animals to the lever 12 to compensate for the draft of the animals attached to the extension of the lever 14.

In the manner described, this device may be adjusted for use in connection with one or more draft animals working in opposition to two or more draft animals, whereby the draft is proportioned. A pair of bolts 40 are passed through the forward and rear ends of the plates 5, and carry bars 42 on their lower ends, whereby the tongue of the vehicle may be passed through the respective pairs of bolts 40 and between the bars 42 and the lowermost plate 5, and in which event upon the bolts 40 being tightened, the frame is securely attached to the tongue. A pair of attaching members 41 are also pivoted to the rear ends of the plates 5, for connecting the frame with a gang plow, riding plow or other earth tilting implement. In this manner, the device may be attached to the tongue of a vehicle or to other devices, whereby the same may be drawn forwardly by the draft animals attached to the equalizer.

This invention is simple and substantial in construction and in its use is both convenient and efficient for the purposes for which it is designed. It is understood that the various parts may be constructed of various materials that may be desired or essential, and that the proportions of the details may be altered within the scope of the appended claims without departing from the spirit of the invention.

Having described the invention, what is claimed as new is:

1. A draft equalizer embodying a frame, levers pivoted thereto and projecting laterally, a lever pivoted in the frame, links connecting the former levers with the arms of the latter lever, one of the links being detachable from the corresponding former lever, and extensions pivoted to each other and attachable to the free ends of the said link and lever when the latter are detached.

2. A draft equalizer embodying levers, a connection between the levers including a link detachably connected to one lever, and extensions pivoted to each other and attachable to the free ends of the said link and lever when the latter are detached.

3. A draft equalizer embodying a frame, a short and a long lever pivoted thereto and projecting laterally, a bell crank lever pivoted to the frame in the rear of the said levers with its short arm projecting rearwardly and its long arm projecting laterally toward the side from which the said short lever projects, a short link connecting the short lever and the long arm of the bell crank lever, a long diagonal link connected with the short arm of the bell crank lever and detachably connected with the free end of the long lever, and extensions pivoted to each other and attachable to the free ends of the long diagonal link and the long lever when the latter are detached.

In testimony that I claim the foregoing as my own, I have hereto affixed my signature in the presence of two witnesses.

JOSEPH DETERS.

Witnesses:
J. A. LUTZ,
J. W. RITZ.

---

Copies of this patent may be obtained for five cents each, by addressing the "Commissioner of Patents, Washington, D. C."